United States Patent [15] 3,673,150
Marzocchi [45] June 27, 1972

[54] GLASS FIBER REINFORCED ELASTOMERS

[72] Inventor: Alfred Marzocchi, Cumberland, R.I.

[73] Assignee: Owens-Corning Fiberglas Corporation

[22] Filed: Nov. 20, 1969

[21] Appl. No.: 878,501

[52] U.S. Cl. .................260/41.5 A, 117/72, 117/126 GB, 117/126 GS, 117/126 GN, 260/41 AG
[51] Int. Cl. .........................................C08c 13/20
[58] Field of Search ..............260/37 R, 79.1, 41.5 A, 41 AG; 117/126 GR, 126 GQ, 126 AB, 126 AQ, 72

[56] References Cited

UNITED STATES PATENTS

| | | | |
|---|---|---|---|
| 2,466,963 | 4/1949 | Patrick | 117/126 GR |
| 2,618,959 | 11/1952 | Watkins | 260/79.1 |
| 3,306,000 | 2/1967 | Barnes | 260/41 AG |
| 3,424,608 | 1/1969 | Marzocchi | 117/126 GR |
| 3,479,207 | 11/1969 | Marzoochi | 117/126 GR |
| 3,505,100 | 4/1970 | Vanderbilt | 117/126 GR |
| 3,476,826 | 11/1969 | Millen | 260/79.1 |
| 3,524,835 | 8/1970 | Edmonds | 260/79.1 |

OTHER PUBLICATIONS

A. Damusis, " Sealants," Oct. 1967, Reinhold Pub., New York, p. 175– 181

*Primary Examiner*—Morris Liebman
*Assistant Examiner*—P. R. Michl
*Attorney*—Staelin & Overman and Herman I. Hersh

[57] ABSTRACT

The improvement in the bonding relationship between glass fibers and elastomeric materials in the manufacture of glass fiber-reinforced elastomeric products wherein the individual glass fibers are sized, or a bundle of glass fibers are impregnated, with a composition containing a polysulfide.

6 Claims, 4 Drawing Figures

PATENTED JUN 27 1972 3,673,150

INVENTOR
Alfred Marzocchi
By Staelin & Overman
Att'ys

GLASS FIBER REINFORCED ELASTOMERS

This invention relates to elastomeric products reinforced or otherwise combined with glass fibers and it relates more particularly to the method and compositions employed in the treatment of the glass fibers to enhance the bonding relationship between the glass fibers and the elastomeric materials for making fuller utilization of the desirable characteristics of the glass fibers in their combination with the elastomeric materials.

The term "glass fibers," as used herein, shall refer to (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure stream of air directed angularly downwardly onto multiple streams of molten glass issuing from the bottom side of a glass melting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such yarns of discontinuous fibers, and (3) combinations of such continuous and discontinuous fibers in strand, yarn, cord and fabrics formed thereof.

As used herein, the term "elastomer" is intended to mean and include natural rubber in the cured or uncured stages, vulcanized or unvulcanized stage, and synthetic organic elastomeric materials such as styrene, nitriles, acrylic and esters and terpolymers thereof with styrene and acrylonitriles; styrene and vinyl pyridine; and EPDM rubbers as represented by butadiene polymers and copolymers with monoolefins such as butadiene-styrene copolymer, butadiene-acrylonitriles copolymer, butadiene-styrene-vinyl pyridine terpolymer, chloroprene, isoprene, neoprene, isobutyl rubber and the like elastomeric polymers and copolymers in their cured or uncured stages, and vulcanized or unvulcanized stages. Included also are the sulphur vulcanizable or curable EPDM rubbers as represented by the interpolymerization of ethylene, an alpha monoolefin, etc.

The invention is addressed to the fuller utilization of the desirable characteristics of glass fibers, such as their high strength, flexibility, thermal stability, chemical stability, inertness, electrical resistance and heat conductive characteristics when used in combinations with elastomeric materials as a reinforcement or as a stabilizing agent in belt manufacture, as reinforcing cords and fabrics to increase strength, life, wearability, and service characteristics in rubber tires, and as a reinforcement and the like in other elastomeric coated fabrics and molded elastomeric products.

It is an object of this invention to provide a new and improved composition which may be used as a forming size for treatment of glass fibers in forming or preferably as an impregnating composition for treatment, in forming or afterwards, of bundles, yarns, cords, strands and fabrics formed of glass fibers to enable fuller utilization to be made of the desirable characteristics of the glass fibers when used in combination with elastomeric materials in the manufacture of glass fiber reinforced molded products and coated fabrics.

More specifically, it is an object of this invention to provide a composition for use in the treatment of glass fibers in forming to improve the processing and the performance characteristics of the glass fibers as a reinforcement for elastomeric materials and for use in the treatment of bundles, strands, yarns, cords and fabrics of glass fibers, in forming or afterwards, to enhance their bonding relationship when used in combination with elastomeric materials in the manufacture of glass fiber reinforced plastics, laminates or coated fabrics and it is a related object to provide a method and means for making fuller utilization of the strength properties of glass fibers when used as a reinforcement for elastomeric materials.

These and other objects and advantages of this invention will hereinafter appear and, for purposes of illustration, but not of limitation, an embodiment of the invention is shown in the accompanying drawing in which FIG. 1 is a flow diagram showing the manufacture of continuous glass fibers and the treatment thereof in forming to improve the processing characteristics of the glass fibers and to improve the performance characteristics of the glass fibers when used in combination with elastomeric materials in the manufacture of glass fiber reinforced elastomeric products;

Figure 1:
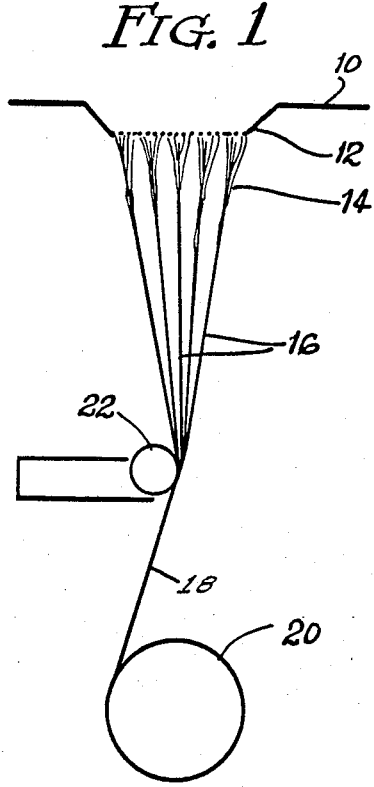

To the present, glass fibers which have been added or otherwise incorporated with elastomeric materials, in the form of continuous or chopped fibers, having functioned more or less as a filler than as a reinforcement, or flexibilizing agent, or stabilizing agent. As a result, little, if any, improvements in mechanical and physical properties have been made available from the combinations which made use of glass fibers in products formed of elastomeric materials. It is believed that the failure to make fuller utilization of some of the more desirable properties of the glass fiber components resides in the inability properly to integrate the glass fibers with the elastomeric system.

Investigations have been conducted over the past several years by the most highly skilled in the art in the attempt to make fuller utilization of the glass fiber components formulated into elastomeric materials in the endeavor to fabricate products having new and improved physical and mechanical properties. Substantial inroads are now being made as represented by the practice of this invention, as will hereinafter be described.

The invention will be described with reference to an improved composition which can be employed as an original size applied to the glass fibers in forming thereby individually to coat each of the glass fiber filaments subsequently formed into the strand, yarn, cord or fabric to provide both the desired processing and performance characteristics for processing the sized glass fibers in the formation of the strand and in the twisting and plying of the strands into yarns or cords and in the processing of the strands, yarns or cords into fabrics and the desired performance characteristics for enhancing the bonded relationship when the sized glass fibers are combined with elastomeric materials in the manufacture of reinforced elastomeric products.

In the preferred practice of this invention, the composition is formulated as an impregnating composition for treatment of strands, yarns, cords and fabrics formed of previously sized glass fibers for penetration of the treating composition into the strand, yarn, cord or fabric with the intention of individually coating the fibers to protect the fibers against destruction by mutual abrasion while establishing a bonded relationship therewith or else penetrating the glass fiber strand, yarn, cord or fabric sufficiently to intertie the glass fiber system with the elastomeric materials with which the glass fibers are combined in the manufacture of glass fiber - elastomeric products.

The following examples will serve to illustrate the principal concepts of this invention in a composition and the method for the treatment, as by impregnation, of bundles, yarns, cords and fabrics of glass fibers wherein the fibers have previously been sized in forming with a conventional size composition which has preferably been modified to embody a glass fiber anchoring agent.

EXAMPLE 1

Forming Size Composition 8.0 percent by weight partially dextrinized starch
1.8 percent by weight hydrogenated vegetable oil
0.4 percent by weight cationic wetting agent (lauryl amine acetate)
0.2 percent by weight nonionic emulsifying agent
1.0 percent by weight gamma-aminopropyltriethoxy silane
88.6 percent by weight water

EXAMPLE 2

Forming Size Composition 3.2 percent by weight saturated polyester resin
0.1 percent by weight fatty acid amine wetting agent (Nopcogen 16 L)
0.1 percent by weight polyvinyl alcohol
3.0 percent by weight pyrrolidine
0.3 percent by weight gamma-aminopropyltriethoxy silane
0.1 percent by weight glacial acetic acid
93.2 percent by weight water

EXAMPLE 3

Forming Size Composition 0.2 percent by weight paraffin wax in aqueous emulsion
1.3 percent by weight cationic amide polyester resin
2.3 percent by weight polyglycol condensate (300 to 400 m w)
0.25 percent by weight gelatin
0.5 percent by weight gamma-aminopropyltriethoxy silane
0.1 percent by weight dibasic ammonium phosphate
0.2 percent by weight glacial acetic acid
95.15 percent by weight water Referring now to the schematic diagram of FIG. 1, the glass is melted in a glass melting furnace 10 having a bushing 12 on the bottom side. The bushing is formed with a plurality of openings extending therethrough and the molten glass flows gravitationally through the hundreds of small openings in the bushing to form therein streams 14 which are rapidly attenuated into fine glass filaments 16 by winding the filaments about a rapidly rotating drum 20. The filaments 16 are sized with one of the size compositions of Examples 1 to 3 as they are gathered together to form a strand. For this purpose, use is made of an applicator 22 which is illustrated as a wiping pad that is constantly wet with the form size composition. The filaments of glass are each wet with the size composition as they are gathered together to form the strand 18 that is wound about the drum 20.

The sized strands are allowed to air dry or drying of the thin size coating can be accelerated by exposure to elevated temperature such as a temperature within the range of 150° to 250° F. The applied size forms a very thin coating 24 on the surface of the glass fibers 16 to impart a desired balance of lubricity and bonding without destroying the fibrous characteristic or appearance of the fiber.

The strand 18 of sized glass fibers is preferably plied with other strands and twisted to form yarns, threads, or cords which may be used as a reinforcement for elastomeric materials, with or without cutting to shorter lengths, and which can be formed into woven or non-woven fabrics for subsequent combination with elastomeric materials.

After the fibers have been processed into strands, yarns, cords or fabrics, hereinafter referred to generally as bundles, the bundles of sized glass fibers are impregnated with a composition embodying the features of this invention, as represented by the following examples:

EXAMPLE 4

Figure 2:
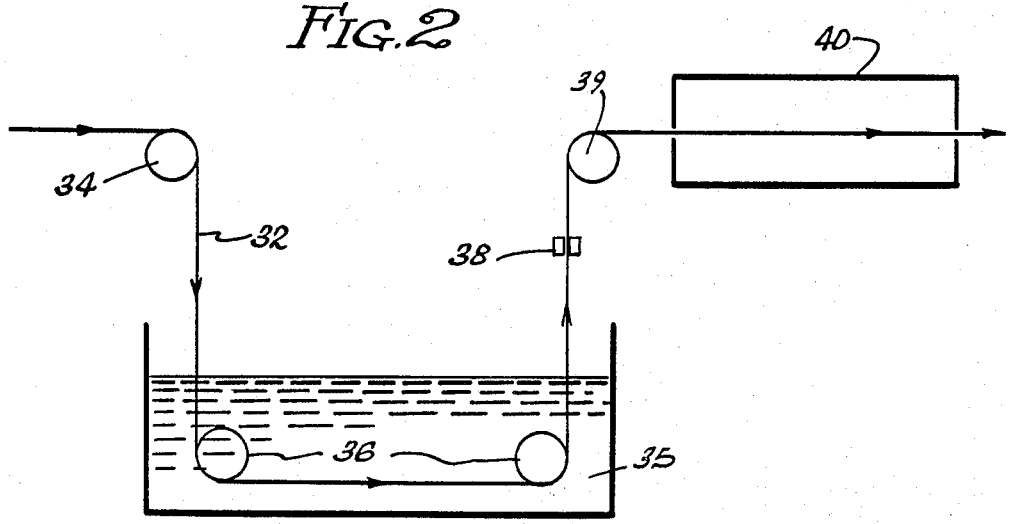
FIG. 2 is a flow diagram illustrating the treatment of glass fibers subsequent to their being formed into bundles, strands, yarns, cords or fabrics to impregnate the glass fiber bundles in accordance with the preferred practice of this invention.

Impregnating Composition 30.0 parts by weight polysulfide (70 percent solids—Thiokol A)
70.0 parts by weight water Impregnation with the aqueous composition of Example 4 can be made by way of a solvent bushing but it can also be achieved by other conventional means for impregnation, such as by immersion by the bundles of glass fibers in a bath of aqueous impregnating composition. Referring more specifically to FIG. 2 of the drawing, the glass fiber bundle 32 is advanced over a guide roller 34 for passage downwardly into the bath 35 containing the impregnating composition of Example 4. The bundle is then turned under roller 36 to effect a sharp bend which operates to open the bundle to enable fuller penetration of the aqueous impregnating composition into the bundle of sized fibers for fuller impregnation of the bundle. The impregnated bundle is then raised from the bath for passage through a roller or die 38 which operates to remove excess impregnating composition from the bundle and to work the impregnating composition into the bundle. Thereafter the endless bundle is advanced over the roller 39 into a drying oven preferably in the form of an air drying oven maintained at a temperature above ambient temperature and preferably at a temperature within the range of 150° to 350° F. to accelerate removal of the aqueous diluent and to set the impregnating material in situ in the glass fiber bundle. Dielectric drying may also be used. Drying will occur in a relatively short period of time, ranging from 1 to 30 minutes, depending somewhat upon the temperature of drying.

The polysulfide polymer, available in the United States under the trade name of "Thiokol A," comprises the condensation reaction product of sodium tetrasulfide and ethylene dichloride in the mole ration of about 1:1. If desired, a magnesium hydroxide catalyst may be used to promote the reaction between the sulfide and the organic dihalide. The amount of polysulfide in the aqueous composition is not critical, and can generally be varied within the range of 15 to 50 percent by weight. Introduction should be made in an amount to impregnate with dry solids constituting 5 to 25 percent by weight of the glass fiber system.

It will be understood that a wide variety of polysulfides are suitable for use as an impregnate according to the present invention. Illustrative are the polysulfides formed by the reaction of an alkaline polysulfide with dihalides such as methylene and propylene dihalides, glycerol dichlorohydrin, dichloroethyl ether, dichloroethyl formal and triglycol dichloride.

It will be understood that various alkaline polysulfides may be used in place of the sodium tetrasulfide employed in Example 4. In general, it is preferred to use the tri-, tetra- and pentasulfides of the alkali metals in forming the polysulfides to be used in accordance with the present invention.

In accordance with a further concept of the present invention, the glass fiber bundle may be treated with a monomer from which the polysulfide is produced, whereby the monomer forms a thin coating on the glass fiber surfaces which can be reacted with the other reactant to form the polysulfide directly on the glass fiber surfaces, according to the following examples:

EXAMPLE 5

A bundle of glass fibers is immersed in a bath of hot ethylene dichloride maintained at 75° C. to form a thin coating on the glass fiber surfaces. The fibers are thereafter immersed in an aqueous bath containing 40 percent by weight sodium tetrasulfide and 10 percent by weight magnesium hydroxide maintained at 150° C., and are allowed to remain for a period of 1–6 hours to enable the reaction between the alkaline polysulfide and the dichloroethane to take place.

The glass fibers are removed, washed with warm water and allowed to dry. It is found that the glass fibers contain 6 percent by weight of the polysulfide in the form of a thin coating on the glass fiber bundle.

While the foregoing example of sequential treatment of the glass fiber bundle has been described in reference to first treating the fiber bundle with ethylene dichloride and followed with treatment with an alkylene polysulfide, it will be understood that the sequence may be reversed whereby the glass fibers are first treated with sodium tetrasulfide and then the organic dihalide. However, in either case it is preferred that the catalyst be contained in the last treating bath employed in the sequence.

In accordance with a further concept of the present invention, the polysulfide may be used in a composition for impregnation of glass fibers wherein the composition contains an additional component, preferably an elastomer compatible impregnate such as a resorcinol aldehyde latex, hereinafter referred to as RFL. Such compositions may be formulated in the manner shown by the example.

EXAMPLE 6

2–20 parts by weight natural rubber latex—resor-formaldehyde resin(38 percent solids)("Lotol 5440")
15–50 parts by weight polysulfide Water is incorporated into the foregoing composition to produce an impregnating composition having a minimum solids content of 10 percent by weight and a maximum solids content of 50 percent by weight. Distribution should be made in an amount to impregnate dry solids constituting 5–25 percent by weight of the glass fiber system, and preferably 10–15 percent by weight.

Suitable resorcinol aldehyde resins and combinations thereof with natural rubber latex are marketed by the U. S. Rubber Company under the trade name "Lotol 5440." For the preparation of such materials, reference can be made to Canadian Pat. No. 435,754 wherein description is made of the reaction of resorcinol and formaldehyde in the presence of a substantial amount of short-chained alkylamines for the purpose of stabilizing the reaction and the products formed therefrom, as well as a description of the combination of the formed resin with rubber latex.

Another elastomer compatible impregnate which may be used in lieu of the RFL system illustrated in Example 6 is a vinyl pyridine-butadiene-styrene terpolymer composition of the type disclosed in U. S. Pat. No. 3,424,608, which can be formulated as follows:

EXAMPLE 7

| | Parts by weight |
|---|---|
| Resorcinol formaldehyde resin | 2–10 |
| Formaldehyde (37% solution) | 1–3 |
| Concentrated ammonium hydroxide | 2–5 |
| Vinyl pyridine-butadiene-styrene terpolymer (42% solids) | 15–50 |
| Neoprene rubber latex(50% solids) | 25–50 |
| Butadiene latex(60% solids) | 5–15 |
| Alkali metal hydroxide | 0.05–0.2 |
| Polysulfide | 15–50 |

Water is incorporated with the foregoing materials in amounts to produce an impregnating composition having a minimum solids content of 10 percent and a maximum solids content of about 50 percent by weight. Introduction should be made in an amount to impregnate with a dry solid of 5–25 percent by weight of the glass fiber system and preferably 10–15 percent by weight.

Use may also be made of an elastomer compatible impregnant comprising a vinyl pyridine-butadiene-styrene terpolymer latex and a resorcinal aldehyde resin in place of the RFL.

It is desirable to achieve as full impregnation as possible into the bundles of glass fibers in order to more effectively separate the fibers one from the other by the impregnating materials since the solids are effective as a coating on the sized glass fibers to cush the fibers and to protect the fibers against destruction by mutual abrasion. Thus, it is desirable to achieve as deep penetration as possible with the impregnating composition into the glass fiber bundle. The deeper the penetration, the more effective will be the bond between the glass fibers in the bundle and the elastomeric material with which the bundles of glass fibers are combined in the manufacture of the glass fiber - elastomeric product.

In the final system, the elastomeric material with which the glass fibers are combined will constitute a continuous phase. Such continuous phase of elastomeric material may comprise rubbers of the type incorporated into the impregnating composition or the elastomeric material can differ therefrom. The continuous phase of elastomeric material can be employed in the cured or uncured state or in the vulcanized or unvulcanized state. It is believed that the tie-in between the impregnated bundles of glass fibers and the elastomeric material forming the continuous phase will occur primarily during cure or vulcanization of the elastomeric material during the fabrication of the elastomeric material.

More complete protection for the individual glass fibers and a fuller coordination with the elastomeric material in the continuous phase can be achieved when the impregnating compositions of Examples 4 and 5 are modified for treatment of the glass fibers as a size composition which can be applied to the individual glass fibers as they are formed, as illustrated in FIG. 1 of the drawing, or afterwards if the original size is removed. For this purpose, the impregnating composition of this invention should be formulated to include an anchoring agent, such as gamma-aminopropyltriethoxy silane. Instead of gamma-aminopropyltriethoxy silane, in the size or in the impregnating composition, use can be made of other organo silicon compounds in which the organic group attached to the silicon atom contains an amino group,such as beta-aminovinyldiethoxy silane, gamma(triethoxysilylpropylamide) propylamine, N(gamma-triethoxysilylpropyl) propylamine, beta-aminoallyltriethoxy silane, and para-aminophenyltriethoxy silane. Use can be made of other organo silicon compounds in the form of a silane, silanol or polysiloxane in which the organic group attached to the silicon atom contains an epoxy group, such as glycydoxypropyltrimethoxy silane or 3,4-epoxycyclohexylethyltrimethoxy silane. Instead of the organo silicon compounds, use can be made of a Werner complex compound in which the carboxylato group coordinated with the trivalent nuclear chromium atom contains an amino group or an epoxy group such as aminopropylato chromic chloride, glycine chromic complex, S-alanine chromic complex, or glycylate chromic chloride.

A forming size embobying further concepts of the present invention can be formulated as follows:

EXAMPLE 8

| | Parts by weight |
|---|---|
| Polysulfide | 15–50 |
| Anchoring agent | 0.1–3.0 |

To the foregoing, water is added to form an aqueous dispersion in an amount to provide for a solids content within the range of 2 to 20 percent by weight. Application should be made to deposit dry solids constituting 1 to 4 percent weight of the sized glass fibers.

EXAMPLE 9

| | Parts by weight |
|---|---|
| Natural rubber latex - resorcinol | 2–20 |

| | |
|---|---|
| formaldehyde resin (38% solids) | |
| Vinyl pyridiene-butadiene-styrene terpolymer | 10–40 |
| Polysulfide | 2–20 |
| Gamma-aminopropyltriethoxy silane | 0.1–3.0 |

EXAMPLE 10

| | Parts by weight |
|---|---|
| Resorcinol formaldehyde resin | 2–10 |
| Formaldehyde(37% solution) | 1–3 |
| Concentrated ammonium hydroxide | 2–5 |
| Vinylpyridine terpolymer latex (42% solids) | 15–50 |
| Neoprene rubber latex(50% solids) | 25–50 |
| Butadiene latex(60% solids) | 5–15 |
| Alkali metal hydroxide | 0.05–0.2 |
| Anchoring agent | 0.1–3.0 |
| Polysulfide | 2–10 |

To the foregoing, water is added to form an aqueous dispersion in an amount to provide for a solids content within the range of 20–45 percent by weight. Application should be made in an amount to deposit a dry solids of 7–20 percent by weight of the sized glass fibers.

In the size compositions of Examples 8 to 10, the anchoring agent may be employed in an amount within the range of 0.1 to 3.0 percent by weight of the size composition, and preferable within the range of 0.1 to 1.0 percent by weight.

Figure 3:
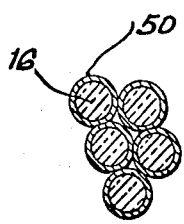
FIG. 3 is a cross-sectional view of glass fibers processed in accordance with the diagram illustrated in FIG. 1.
Figure 4:
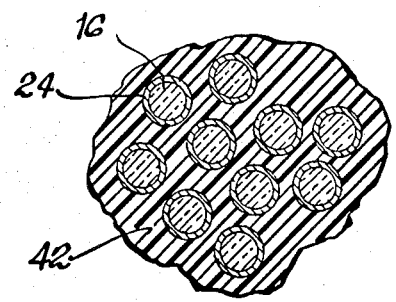
FIG. 4 is a cross-sectional view of a bundle of glass fibers processed in accordance with the flow diagram of FIG. 2.

When the glass fibers are sized in forming with a composition embodying the features of this invention, the sized fibers can be processed directly into sized yarns, strands, cords or fabrics, or used alone in combination with elastomeric materials without the need for impregnation of the bundles of glass fibers since individual fibers 16 of the bundle are already provided with a coating 50 (FIG. 3) formulated to contain the desired components for anchoring the elastomeric material and for protecting the glass fibers to enhance their processing and their performance characteristics.

In fabricating the combinations of the glass fibers treated in accordance with the practice of this invention, with elastomeric materials, the glass fibers or bundles of glass fibers are mixed with elastomeric material or otherwise laid down in the desired arrangement for combination with the elastomeric material as in the manufacture of glass fiber reinforced belts or in the manufacture of rubber tires reinforced with cords of glass fibers. The combination of glass fibers and elastomeric material are processed in a conventional manner by molding or cure under heat and compression or by vulcanization for advancement of the elastomeric material to a cured or vulcanized stage while in combination with the treated glass fibers whereby the glass fibers or bundles of glass fibers become strongly integrated with the elastomeric material in the glass fiber - elastomeric product.

It will be understood that the size compositions, represented by Examples 8 to 10, may also be employed as impregnating compositions, preferably with lesser dilution with aqueous medium, since the anchoring agent embodied in the size composition will continue to operate as an anchoring agent further to facilitate the bonding relationship or integration between the elastomeric material of the continuous phase and the treated glass fibers.

It will be apparent that I have provided a new and improved composition for use in the treatment of glass fibers and bundles of glass fibers to enhance their integration with elastomeric materials in the manufacture of glass fiber - elastomeric products.

It will be understood that invention exists not only in the composition for use in the treatment of the glass fibers to prepare the glass fibers for combinations with elastomeric materials but that invention exists also in the process in which the compositions are employed in the treatment of glass fibers as well as the treated or impregnated glass fiber products formed thereof.

It will be understood that changes may be made in the details of formulation and methods of application or use without departing from the spirit of the invention, especially as defined in the following claims.

I claim:

1. An elastomeric product comprising an elastomer selected from the group consisting of natural rubber, chloroprene, isoprene, neoprene, isobutyl rubber, EPDM rubbers, and synthetic organic elastomers based upon one or more monomers selected from the group consisting of butadiene, styrene, acrylonitrile, vinyl pyridine and acrylic esters as the continuous phase and glass fibers distributed within the continuous phase of the elastomer and a thin coating on the surfaces of the glass fibers to enhance the bonding relationship between the elastomer and said surfaces, said coating comprising a polysulfide formed by the reaction of an organic dihalide with an inorganic polysulfide.

2. An elastomeric product as defined in claim 1 wherein said polysulfide constitutes 5–25 percent by weight of the glass fibers.

3. An elastomeric product as defined in claim 1 wherein said coating contains an anchoring agent selected from the group consisting of an organo silicon compound and a Werner complex compound.

4. An elastomeric product as defined in claim 1 wherein said coating also contains a resorcinol aldehyde latex.

5. An elastomeric product as defined in claim 1 wherein said coating also contains a vinyl pyridine-butadiene-styrene terpolymer.

6. An elastomeric product as defined in claim 1 wherein the glass fibers are in the form of a bundle, with the individual glass fibers forming the bundle having a size coating on the surfaces thereof, and wherein said thin coating is in the form of an impregnant in the bundle.

* * * * *